United States Patent [19]

Brodetsky

[11] Patent Number: 5,528,120
[45] Date of Patent: Jun. 18, 1996

[54] ADJUSTABLE ELECTRONIC POTENTIAL RELAY

[75] Inventor: Alexander Brodetsky, Toms River, N.J.

[73] Assignee: Sealed Unit Parts Co., Inc., Allenwood, N.J.

[21] Appl. No.: 303,769

[22] Filed: Sep. 9, 1994

[51] Int. Cl.⁶ ...................................... H02P 1/42
[52] U.S. Cl. .................... 318/785; 318/778; 318/782; 318/781
[58] Field of Search ..................... 318/778, 782, 318/781, 785, 790, 805, 812, 430, 445; 361/1, 23

[56] References Cited

U.S. PATENT DOCUMENTS

| | | |
|---|---|---|
| 3,549,970 | 12/1970 | Lewus . |
| 3,784,846 | 1/1974 | Krick et al. . |
| 4,042,964 | 8/1977 | Nurnberg et al. . |
| 4,196,462 | 4/1980 | Pohl . |
| 4,200,829 | 4/1980 | Pohl . |
| 4,366,426 | 12/1982 | Turlej . |
| 4,772,808 | 9/1988 | Vial . |
| 4,786,850 | 11/1988 | Chmiel . |
| 4,804,901 | 2/1989 | Pertessis et al. . |
| 4,820,964 | 4/1989 | Kadah et al. . |
| 4,906,857 | 3/1990 | Cummins et al. . |
| 4,917,411 | 4/1990 | Cummins . |
| 5,103,154 | 4/1992 | Dropps et al. . |
| 5,162,718 | 11/1992 | Schroeder . |
| 5,206,573 | 4/1993 | McCleer et al. . |
| 5,247,236 | 9/1993 | Schroeder . |
| 5,296,795 | 3/1994 | Dropps et al. . |

*Primary Examiner*—William M. Shoop, Jr.
*Assistant Examiner*—Karen Masih
*Attorney, Agent, or Firm*—Lerner, David, Littenberg, Krumholz & Mentlik

[57] ABSTRACT

A starting circuit for a single-phase induction motor having a start capacitor, an auxiliary or start winding, and a run winding includes user adjustable pick-up voltage means to allow a user to select a pick-up voltage in the field to correspond to the pick-up voltage of a particular induction motor such that a relay disconnects the start winding from the power supply when the start winding voltage exceeds the selected pick-up voltage. Protective circuitry is provided including a timing circuit to protect from missetting of the pick-up voltage or when the motor will not start for any reason and a relay current circuit to control the current flowing in the relay to protect from high voltage overloading.

25 Claims, 1 Drawing Sheet

ADJUSTABLE ELECTRONIC POTENTIAL RELAY

FIELD OF THE INVENTION

The present invention relates to a starting circuit for a single-phase induction motor, and more particularly, to a starting circuit that includes an adjustable pick-up voltage setting that can be set in the field by the user to match the rated pick-up voltage for a given induction motor.

BACKGROUND OF THE INVENTION

Single-phase, high starting torque motors, sometimes known as split-phase or capacitor-start motors, are commonly used in household appliances such as air-conditioners, washing machines and refrigerators to drive compressors and the like. Such motors incorporate a main or run winding, which is continually connected to an AC power supply during the operation of the motor, and an auxiliary or start winding which is initially connected to the power supply to generate enough starting torque to initiate rotation of the motor shaft and thereafter effectively disconnected from the motor circuit. In certain types of capacitor-start motors, two capacitors are used. A start capacitor in series with the start winding is provided to generate a phase shift between currents of the two windings while a run capacitor remains connected to the start and run windings during operation of the motor to provide a current to the start winding to increase the power factor for better efficiency.

Typically, in such single-phase motors a centrifugally operated switch or mechanical relay is provided to disconnect the start winding and start capacitor from the power supply when the motor has reached about 75% of its rated RPM. The start winding is disconnected at this point because there is enough motor torque at that speed level to overcome the increased load and to boost the motor to its rated RPM. If the start winding is disconnected too early, for example at about 50% of the motor's rated RPM, the motor experiences a breakdown torque, i.e., at 50% of its rated speed the run winding cannot continue to increase the RPM and the motor will die down to a stall.

Two types of mechanical relays often used with single-phase high starting torque motors are current activated relays and potential (voltage) activated relays. The current relay is generally limited to use only with small motors with a maximum of about one-third horsepower. This is because the energizing coil of the relay, which is in series with the motor's run winding, experiences the current of the run winding and can be damaged by high current levels. Higher horsepower motors therefore generally use potential relays because the potential relay's energizing coil is voltage activated and therefore not affected by high current surges in the run winding.

The present state of the art of most starting circuits employing potential relays is to connect the energizing coil of the relay across the start winding of the motor such that the induced voltage in the start winding will also be sensed by the relay coil. Because there is a direct relationship between the RPM of the motor and the induced voltage on the start winding, it is a simple matter to note the voltage when 75% of the motor speed is attained and disconnect the start winding and start capacitor at that point. This point at which the relay activates to disconnect the start winding from the power supply is what is generally referred to as the "pick-up" voltage. Therefore, a particular relay is chosen so that at the pick-up voltage, its coil will activate an armature and open normally closed contact points to effectively disconnect the start winding and start capacitor from the power supply.

Oftentimes a service technician must replace a defective or worn potential relay in the motor starting circuit. However, selecting a suitable replacement relay for the particular motor can be problematic. This is because when an engineer designs a motor for a specific application, such as for a refrigerator compressor, the engineer does not refer to any standard start and run winding specifications, since these specifications generally do not exist. As a result, motors of the same rated horsepower but manufactured by different companies will have a variety of different pick-up voltage points. This situation has led to confusion in the replacement market for defective and worn potential relays.

Furthermore, replacement of a relay can be a problem since manufacturers of potential relays do not generally identify the relays by their pick-up voltage points. Typically, the only numbers imprinted on a relay are for internal use by the manufacturer of the particular unit. Therefore, a service engineer who has to replace a defective potential relay usually must show the relay to the wholesaler who in turn must refer to many cross-reference charts to match the particular relay's number to a pick-up voltage, and then cross-reference that pick-up voltage to a relay manufacturer who hopefully has that relay in stock. Moreover, if there are not any identifiable numbers on the relay, the service engineer must contact the manufacturer of the unit to determine what replacement relay can be used.

All of this effort involved with what should be a simple task of replacing a relay wastes unnecessary time, increases labor costs, and ultimately results in higher repair costs for the consumer. Moreover, since each given motor from a manufacturer usually requires a different relay, a service technician must keep a large inventory of relays rated for many different pick-up voltages to guarantee that the right replacement relay is on hand for ready replacement. This also increases repair costs since many relays purchased and kept on hand are never even used.

Some effort have been devoted to designing induction motor protective circuits which include starting circuits as well. For example, U.S. Pat. No. 4,196,462 to Pohl is directed to a motor protective control circuit for an induction motor having both the start and run windings connected to the motor during its operation. As a protective measure, a mechanical relay is used to completely disconnect the power source from both windings of the motor upon excessive loading or if the start winding voltage falls outside adjustable maximum and minimum values. A timing circuit is also provided for disconnecting the power supply from the motor if the start winding voltage does not rise above the minimum cut-off value. However, since the motor does not include an auxiliary start winding which is to be disconnected from the motor after start-up, the protective control circuit is not concerned with removing the start winding once the pick-up voltage is attained.

Although mechanical relays have been used for many years in motor starting circuits and are desirable because of their relatively low cost and reliability, newer motor starting circuits are now replacing the mechanical relay with a solid-state switching device, such as a triac, to electronically switch out the start winding after a certain condition has been satisfied.

For example, U.S. Pat. No. 5,296,795 to Dropps et al. is directed to a starting system for electrical motors which uses a solid-state triac as a switching device which is serially connected to the start winding of the motor. The start winding "cut-in" and "cut-out" voltages, along with the slope of the motor speed cut-out relative to line voltage, are calibratable by changing the values of various resistors. Although this reference recognizes the need to provide a starting circuit to be used with a wide range of motor ratings, it does not contemplate the use of a device in which the "cut-out" or pick-up voltage is adjustable on site or in the field by the user. In other words, the calibration resistors initially selected and are not adjustable once installed in the starting circuit.

U.S. Pat. No. 4,804,901 to Pertessis et al. is directed to a motor starting circuit which monitors an average value in the main winding current for switching power to the start winding. A circuit is provided to generate a certain reference or threshold level based on the peak value of the main winding current. An electronic switch consisting of two triacs is provided and controlled by a comparator for switching the current on and off in the start winding based on measurements of the main winding current. The threshold generation circuit adapts to any value of current in the main winding independent of the size of the motor so that a single circuit can potentially be used for motors having various horsepowers without the need for setting a specific threshold value. However, this starting circuit is not replaceable, designed for a particular motor and is non-adjustable in the field.

Other starting circuits for induction motors use timers to disconnect the start winding and start capacitor from the power supply after a given period of time independent of the measured voltage in the run or start windings. For example, U.S. Pat. No. 4,786,850 to Chmiel is directed to a motor starting circuit with a time delay cut-out of the start winding which uses a triac and an RC timing circuit to disconnect the auxiliary start winding after a preset time delay. Likewise, U.S. Pat. No. 4,366,426 to Turlej is directed to a time-responsive switching circuit for a single-phase motor in which a triac in series with the start winding of the motor is controlled to disconnect the start winding after a predetermined time delay.

Thus, in the present age of solid-state electronics, it has been the trend in the industry to replace mechanical relay switches with electronic solid-state switches such as triacs. Although some advantages are gained with solid-state switches such as longer life and a sparkless operation that may have advantages in combustible atmospheres, several undesirable effects result. For instance, the control electronics required to operate the solid-state switch are typically complicated, require additional components and therefore increase manufacturing costs of the starting circuit resulting in a more expensive product. In addition, with solid-state switches, there can be an unwanted delay associated with the energizing of the electronic switch before it disconnects the start winding and capacitor which can cause damage to the motor. Also, an electronic switch should have a much higher rating than is necessary for a particular application because it cannot handle an excessive overload such as a locked rotor condition.

SUMMARY OF THE INVENTION

Accordingly, it is an object of the present invention to provide an improved starting circuit for a single-phase induction motor having an auxiliary or start winding, whereby the pick-up voltage may be adjustable on site or in the field by a service technician to match any number of different motors having different rated pick-up voltages, such that a single, universal starting circuit can be used for a variety of motors.

It is also an object of the present invention to provide a low-cost, easily manufactured starting circuit which includes the benefits of solid-state control electronics as well as the benefits of a mechanical relay to disconnect the start winding and start capacitor from the power supply once the motor pick-up voltage is attained.

It is a further object of the present invention to provide additional protective features to such a starting circuit. One such protective feature includes a timing circuit to automatically disconnect the start capacitor and start winding after a predetermined amount of time to protect against missetting of the pick-up voltage by the user and also protect the start winding if the motor stalls for any reason. Another protective feature provides a circuit which monitors the current flowing in the relay coil to protect it from high voltage overload from the voltage on the start winding which rises from induction from the run winding. Another protective measure involves protecting against a low voltage, such as in a brown-out or other temporary condition situation, where the pick-up voltage level cannot be attained.

Therefore, the aforementioned problems of the prior art are overcome, the above objects are achieved, and other advantages are provided by the present invention, which provides a starting circuit for a single phase induction motor having a start capacitor, a start winding and a run winding, the starting circuit having relay means for connecting and disconnecting the start capacitor and start winding from a power supply, and user adjustable pick-up voltage means for allowing a user to select a pick-up voltage in the field, the user adjustable pick-up voltage means being operative to activate the relay means to disconnect the start capacitor and the start winding from the power supply when the start winding voltage exceeds the selected pick-up voltage.

Preferably, the user adjustable pick-up voltage means comprises pick-up reference means, such as a potentiometer, to generate a first signal representing the selected pick-up voltage, means for generating a second signal indicative of the start winding voltage, and comparison means, such as a comparator, to compare the first and second signals and generate a control signal when the start winding voltage exceeds the selected pick-up voltage. The relay means is responsive to the control signal to disconnect the start capacitor and start winding from the power supply.

The starting circuit also includes two additional protective circuits. The first protective circuit includes time-based protection means for automatically disconnecting the start capacitor and start winding from the power supply after a predetermined amount of time to protect the motor against missetting of the selected pick-up voltage and to protect the start winding if the motor will not start for any reason. The time-based protection means preferably includes timing means, such as an RC timing circuit, to generate a timing signal after a predetermined period of time, means for generating a timer reference signal, and comparison means, such as a comparator, to compare the timing signal and the timer reference signal and generate a control signal after the predetermined time, wherein the relay means, responsive to the control signal, disconnects the start capacitor and start winding from the power supply. Preferably, the RC time constant employed should be less than three seconds in order to prevent damage to the start capacitor, and more preferably about one second.

The second protective circuit is used with a relay means that comprises a mechanical relay with a relay coil. In this embodiment, a current control circuit is provided which comprises current control means to maintain the current flowing through the relay coil below a predetermined value to protect the mechanical relay from excessive current created by the rise and start winding voltage induced from the rise in voltage in the run winding.

Preferably, the current control means includes means for generating a first signal indicative of the current flowing through the relay coil, means for generating a reference signal, comparison means, such as a comparator, for comparing the first signal and the reference signal and generating a control signal when the current flowing through the relay coil exceeds a predetermined reference value. In addition, switching means are coupled between the comparison means and the relay coil for selectively regulating the current to the relay coil in response to the control signal to maintain the average current flowing through the relay coil below the predetermined value. Preferably, the current control means further includes a resistor and capacitor defining an RC oscillation circuit connected to the comparison means, where the RC oscillator circuit has an on-off switching frequency in which the switching means, preferably a transistor, is activated and deactivated to control the current flowing through the relay coil.

A method of replacing a first starting circuit with a second starting circuit is also provided, in which the first starting circuit is connected to an induction motor having a start capacitor, start winding, run winding and a given pick-up voltage at which the start capacitor and start winding are to be disconnected from a power supply. The first starting circuit has a fixed pick-up voltage rating corresponding to the given pick-up voltage of the motor. The method comprises the steps of (a) removing the first starting circuit from the motor; (b) replacing the first starting circuit with a second starting circuit having relay means for connecting and disconnecting the start capacitor and the start winding from the power supply, and user adjustable pick-up voltage means for allowing a user to select a pick-up voltage in the field, said user adjustable pick-up voltage means being operative to activate the relay means to disconnect the start capacitor and start winding when the start winding voltage exceeds the selected pick-up voltage; and (c) adjusting the pick-up voltage means in the field to correspond to the given pick-up voltage of the motor.

The objects, features and advantages of the present invention will be more readily apparent from the detailed description of the preferred embodiment set forth below, taken in conjunction with the accompanying drawing.

DETAILED DESCRIPTION OF THE PREFERRED EMBODIMENT

Figure 1:
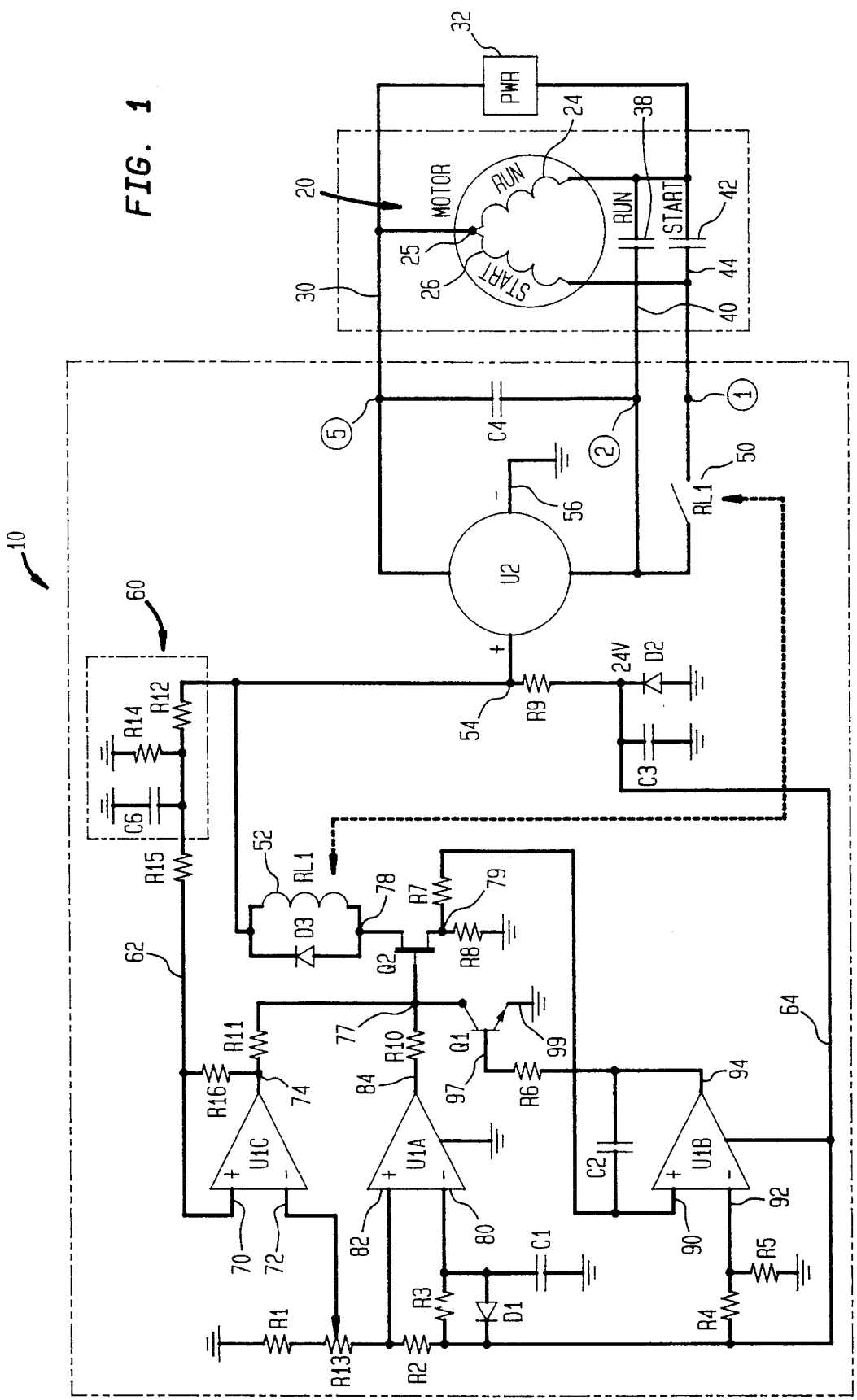
FIG. 1 is a schematic diagram of the motor starting circuit of the present invention.

Referring to FIG. 1, a schematic diagram of the preferred embodiment of the present invention is shown. The starting relay circuit, generally designated as 10, is adapted for use with a single phase induction motor, generally designated as 20. Starting circuit 10 includes connection relay terminals 1, 2 and 5, which are provided to connect to winding terminals of induction motor 20. Relay terminals 1, 2 and 5 correspond to capacitor, motor start winding, and line/motor common terminals, respectively, which are typically provided on replacement potential relays to allow pin-to-pin replacement with existing motors.

Induction motor 20, which includes a run winding 24, a run capacitor 38, an auxiliary or start winding 26, and a start capacitor 42 is of the type in which the start winding and start capacitor is to be disconnected from the power supply once there is enough torque present to overcome the load and drive the motor at its rated RPM. Induction motor 20 can vary in horsepower from about one-half horsepower up to about five horsepower and up to about 250 volts. Start winding 26 and run winding 24 are connected together at one end at a terminal 25 which in turn is connected to line 30. Line 30 is connected to an AC power supply 32, which preferably is a conventional 115/230 volt, 60 Hz power source.

A run capacitor 38 is connected between run winding 24 and start winding 26 and also connected to terminal 2 through line 40. Start capacitor 42 is connected to terminal 1 through line 44 and the junction between run winding 24 and run capacitor 38. Although induction motor 20 is shown to be the type where start and run windings and start and run capacitors are provided, other types of motors, where the auxiliary or start winding is removable once pick-up voltage is reached, can be employed. For example, a split-phase motor can also be used.

Starting circuit 10 includes a bridge rectifier U2, shown in diagrammatic form, which is to be connected across start winding 26 at terminals 5 and 2. Bridge rectifier U2 is also connected across run winding 24 and start capacitor 42 at terminals 5 and 1. Bridge rectifier U2, which also includes a positive input terminal 54 and a negative input terminal 56 connected to circuit common, is a conventional full wave rectifier circuit formed from four diodes and is preferably supplied as a packaged molded unit.

A mechanical relay switch RL1 is provided which includes a relay coil 52 and a normally closed contact switch 50, connected between terminal 1, terminal 2 and bridge rectifier U2. Preferably, mechanical relay switch RL1 comprises a conventional 48 V DC relay such as Omron GBP-1011P. A capacitor C4, connected between terminals 5 and 2 and across bridge rectifier U2, is provided to lower the electromagnetic emission caused by the switching of relay RL1. Relay contact switch 50 includes normally closed contacts which are utilized similar to the contacts of a conventional potential relay. When the contacts of relay contact switch 50 are closed, they connect start winding 26 and start capacitor 42 between terminals 1 and 5, across bridge rectifier U2 and to run winding 24, and when open, disconnect start winding 26 and start capacitor 42 from power supply 32.

Connected to positive input terminal 54 of bridge rectifier U2 is a 12 volt power supply formed by a resistor R9, a zener diode D2 and a capacitor C3. Capacitor C3 and zener diode D2 are connected between line 64 and common, and resistor R9 is connected between zener diode D2 and positive input 54 of bridge rectifier U2.

Also connected to positive input terminal 54 of bridge rectifier U2 is a smoothing filter, generally designated as 60, which includes resistors R12 and R14 and a capacitor C6. Resistor R14 and capacitor C6 are connected between line 62 and common, and resistor R12 is connected between resistor R14 and positive input terminal 54 of bridge rectifier U2. Smoothing filter 60 is provided to scale and filter the voltage at positive input terminal 54, which is representative of the voltage on start winding 26 as explained in further detail below.

Starting circuit 10 also includes a first comparator U1C, which includes a positive input terminal 70, a negative input terminal 72 and an output terminal 74. Positive input terminal 70 is connected to line 62 which is in turn connected to terminal 54 of bridge rectifier U2 through resistor R15 and smoothing filter 60. Connected to negative input terminal 72 is a potentiometer R13 which is connected at one end to line 64 through resistor R2 and to common on the other end through resistor R1. Resistors R1 and R2 provide the desired range of pick-up voltages on the dial of potentiometer R13. Connecting positive input terminal 70 of comparator U1C to output terminal 74 is resistor R16 which provides feedback to avoid chattering of relay R4 when it is energized.

A field effect transistor or FET Q2 is provided and has three terminals including a gate 77, a drain 78 and a source 79. Gate 77 of FET Q2 is connected to output terminal 74 of comparator UC1 through a resistor R11. Connected in parallel between drain 78 of FET Q2 and positive input terminal 54 of rectifier bridge U2 are relay coil 52 and zener diode D3.

Starting circuit 10 also includes a second comparator U1A having a positive input terminal 80, a negative input terminal 82 and an output terminal 84. Connected to positive input terminal 80 is an RC timing circuit which includes a resistor R3 connected between positive input terminal 80 and line 64, and a capacitor C1, connected between positive input terminal 80 and common. Also connected in parallel with resistor R3 between positive input terminal 80 and line 64 is a diode D1. Negative input terminal 82 of comparator U1A is connected to line 64 through a resistor R2, which is connected at one end to potentiometer R13 and at the other end to resistor R3. Output terminal 84 of comparator U1A is connected to gate 77 of FET Q2 through a resistor R10.

A current protection circuit is also provided which includes a third comparator U1B with a positive input terminal 90, a negative input terminal 92 and an output terminal 94. Positive input terminal 90 is connected to source 79 of FET Q2 through a voltage divider consisting of two resistors R7 and R8. A capacitor C2 is also connected between positive input terminal 90 and output terminal 94 of comparator U1B. Capacitor C2 and resistor R7 determine the switching frequency of FET Q2. Line 64 is connected to negative input terminal 92 of comparator U1B through resistors R4 and R5. Output terminal 94 is connected to gate 77 of FET Q2 through a transistor Q1, which is preferably a FET transistor rated for at least 600 volts, and includes a base terminal 97, a collector terminal 98 and emitter terminal 99. Thus, output terminal 94 of comparator U1B is connected to base 97 of transistor Q1 through resistor R6 while gate 77 of FET Q2 is connected to collector 98 of transistor Q1. Emitter 99 of transistor Q1 is connected to common.

The method of operation of the present invention will now be described. Once AC power supply 32 is connected to induction motor 20, a voltage is induced on the start winding 26 as the motor starts to turn. Bridge rectifier U2, which is connected across start winding 26 of induction motor 20, will then develop a DC voltage which is proportional to the voltage induced on start winding 26 when the motor 20 begins to turn. This DC voltage, which appears at positive input terminal 54 of bridge rectifier U2, is then filtered and scaled through smoothing filter 60 to provide a signal on line 62 which is indicative or proportional to the AC voltage induced on start winding 26. This representative voltage on line 62 is then applied to a positive input terminal 70 of a comparator U1C, which compares the voltage at terminal 70 to the pick-up voltage set by the user on potentiometer R13, which is applied to comparator through negative input terminal 72.

When the start winding voltage on start winding 26 exceeds the preset voltage selected by the user at potentiometer R13, comparator U1C alternates its output preferably from zero volts to about 10 volts. This output voltage is then applied to gate 77 of FET Q2 through resistor R11. The application of this voltage to FET Q2 will energize the transistor to provide a current to relay coil 52 to in turn open relay switch 50 and thereby disconnect start capacitor 42 and start winding 26 from power supply 32. Diode 3 protects transistor Q2 and relay RL1 from high voltage spikes induced by the relay coil during switching.

The position of the rotor of potentiometer R13 represents the pick-up voltage level set by the user to correspond to the particular motor pick-up voltage requirement. It can therefore be appreciated that the present invention can be used for starting a large number of induction motor with different rated pick-up voltages. In addition, although the user-selectable adjustment means is preferably a potentiometer, any similar adjustment device or circuit could be used such as DIP switches, field-replacement resistors or various other switches.

The present invention also provides protection against missetting of the pick-up voltage level by the user. Accordingly, if the pick-up voltage is set incorrectly on potentiometer R13, the induced voltage in start winding 26 may never reach the level preset by potentiometer R13 and the potential relay RL1 will not disconnect start winding 26 and start capacitor 42. This can cause damage to motor 20 and/or to start capacitor 42. Therefore, in order to protect the motor 20 and start capacitor 42 in such a case, a time-based protection circuit is provided which includes comparator U1A, resistor R3, capacitor C1 and zener diode D1.

Resistor R3 and capacitor C1 together comprise an RC timing circuit defining an RC time constant based on the values chosen for resistor R3 and capacitor C1. After a predetermined RC time period passes from when the motor attempts to start, comparator U1A alternates its output from a low voltage, preferably zero volts, to a high voltage, preferably about ten volts, which is in turn sent to gate 77 of FET Q2 through resistor R10. Consequently, relay RL1 will energize and the normally closed contacts of relay switch 50 will open to disconnect start capacitor 42 from the power supply, regardless of the pick-up voltage setting on the dial of potentiometer R13. The RC time constant is preferably less than three seconds, and more preferably, about one second, and should be chosen so as to not cause any damage to the motor or start capacitor in the event of the user missetting potentiometer R13 or when the motor will not start for any reason. The action of relay RL1 opening relay contact switch 50 will, however, only take place if during the time period defined by the RC time constant, the motor did not reach its nominal speed. If the motor reaches its nominal speed within the time set by the RC time constant, relay contact switch 50 will have already been opened by comparator U1C as explained above. Diode D1 is provided for fast discharge of capacitor C1 when the motor is shut off to allow the motor to instantly start again.

The present invention preferably employs a mechanical relay switch, although an electronic relay switch such as a triac can also be used. With a mechanical relay as the switching device, a relay current protection circuit is also provided. Relay protection is desirable because when the motor starts turning, the voltage on the start winding will rise as a result of the induction from the run winding. The voltage will be proportional to the motor speed and will continue to rise above the pick-up level until the motor reaches its nominal speed. Consequently, the potential relay coil should endure this voltage at the nominal speed that may even double the value of the pick-up voltage. Standard relays, however, cannot handle such an overload, and therefore, the present invention provides a circuit to protect and provide current control for relay RL1.

The current control circuit, which includes comparator U1B, transistor Q1, capacitor C2, and resistors R4 through R8, operates as follows. The voltage which appears across resistor R8 represents information of the current flowing through relay coil 52. When the current flowing through relay coil 52 exceeds a preset level, the output voltage of comparator U1B will energize transistor Q1, to in turn close transistor Q2 until the relay current lowers to the preset level. Comparator U1B will actually oscillate with the frequency determined by the values of resistor R7 and capacitor C2 providing high frequency on/off current control of relay RL1. The high frequency on-off current control of relay RL1 allows for much lower power dissipation on transistor QZ compared to linear control. With this current control circuit, the average current and voltage on relay RL1 is maintained constant during the motor starting period, and while the motor is running. This current control therefore makes the described relay independent from the motor supply voltage.

The following table lists preferred components used in making the starting circuit in accordance with FIG. 1 of the present invention:

| Component | Value |
| --- | --- |
| Motor 20 | Any 115/220 volt single-phase induction motor with a start capacitor, start and run windings with the start capacitor and winding removed from motor after the pick-up voltage reached. |
| Relay RL1 | Omron GBP-1011P |
| Bridge rectifier U1 | DF08S |
| Transistor Q1 | 2N2222 |
| FET Q2 | BUZ80 |
| Diode D1 | BAV99 |
| Zener Diode D2 | BZX84 (24 V) |
| Diode D3 | 1N4007 |
| Capacitor C1 | 0.22 µF |
| Capacitor C2 | 1000 pF |
| Capacitor C3 | 1 µF, 50 V |
| Capacitor C4 | 4700 pF, 1000 V |
| Capacitor C5 | 0.47 µF, 25 V |
| Capacitor C6 | 0.047 AF |
| Resistor R1 | 30.1 k, 1/8 W |
| Resistor R2 | 82.5 k, 1/8 W |
| Resistor R3 | 10 M, 1/8 W |
| Resistor R4 | 1 M, 1/8 W |
| Resistor R5 | 100 k, 1/8 W |
| Resistor R6 | 47.5 k, 1/8 W |
| Resistor R7 | 30.1 k, 1/8 W |
| Resistor R8 | 47 ohm, 1/8 W |
| Resistor R9 | 180 k, 2 W |
| Resistor R10 | 100 k, 1/8 W |
| Resistor R11 | 100 k, 1/8 W |
| Resistor R12 | 1 M, 1/8 W |
| Resistor R14 | 20 k, 1/8 W |
| Resistor R15 | 681 k, 1/8 W |
| Resistor R16 | 3M, 1/8 W |
| Potentiometer R13 | 50k (side mount) |

Although the invention herein has been described with reference to a particular embodiment, it is to be understood that this embodiment is merely illustrative of the principles and applications of the present invention. It is therefore to be understood that numerous modifications may be made to the illustrative embodiment and that other arrangements may be devised without departing from the spirit and scope of the present invention as defined by the appended claims.

What is claimed is:

1. A starting circuit for a single-phase induction motor having a start capacitor, a start winding and a run winding comprising:

means for connecting the start capacitor, the start winding and the run winding of the motor to a power supply;

relay means for connecting and disconnecting the start capacitor and the start winding from said power supply; and user adjustable pick-up voltage means for allowing a user to select a pick-up voltage in the field, said user adjustable pick-up voltage means being operative to activate said relay means to disconnect the start capacitor and the start winding from the power supply when the start winding voltage exceeds said selected pick-up voltage, and wherein the run winding remains connected to the power supply after said relay means is activated to allow continued operation of the motor after it is started.

2. The starting circuit as claimed in claim 1, wherein said user adjustable pick-up voltage means comprises pick-up reference means for generating a first signal representing said selected pick-up voltage, means for generating a second signal indicative of the start winding voltage, and comparison means for comparing said first and second signals and generating a control signal when the start winding voltage exceeds the selected pick-up voltage, said relay means being responsive to said control signal to disconnect the start capacitor and the start winding from the power supply.

3. The starting circuit as claimed in claim 2, wherein said comparison means comprises a comparator having a first input adapted to receive said first signal, a second input adapted to receive said second signal, and an output for providing said control signal to said relay means.

4. The starting circuit as claimed in claim 3, further comprising a power device coupled between said output of said comparator and said relay means for activating said relay means.

5. The starting circuit as claimed in claim 4, wherein said power device comprises a field effect transistor.

6. The starting circuit as claimed in claim 3, wherein said relay means comprises a mechanical relay.

7. The starting circuit as claimed in claim 3, wherein said pick-up reference means comprises a potentiometer.

8. The starting circuit as claimed in claim 1, further comprising time-based protection means for automatically disconnecting the start capacitor and the start winding from the power supply after a predetermined amount of time to protect the motor against missetting of the selected pick-up voltage and when the motor will not start for any reason.

9. The starting circuit as claimed in claim 8, wherein said time-based protection means comprises timing means for generating a timing signal after a predetermined period of time, means for generating a timer reference signal, and comparison means for comparing said timing signal and said timer reference signal and generating a control signal after said predetermined time, said relay means being responsive to said control signal to disconnect the start capacitor and the start winding from the power supply.

10. The starting circuit as claimed in claim 9, wherein said comparison means comprises a comparator having a first input adapted to receive said timing signal, a second input adapted to receive said timer reference signal, and an output for providing said control signal to said relay means.

11. The starting circuit as claimed in claim 10, wherein said timing means comprises a resistor and a capacitor defining an RC time constant specifying said predetermined period of time.

12. The starting circuit as claimed in claim 11, wherein said RC time constant is less than three seconds.

13. The starting circuit as claimed in claim 11, wherein said RC time constant is approximately one second.

14. The starting circuit as claimed in claim 1, wherein said relay means comprises a mechanical relay having a relay coil, and said starting circuit further comprises current control means for maintaining current flowing through said relay coil below a predetermined value to protect said mechanical relay from excessive current created by the rise in start winding voltage induced from the rise in voltage in the run winding.

15. The starting circuit as claimed in claim 14, wherein said current control means comprises means for generating a first signal indicative of the current flowing through said relay coil, means for generating a reference signal, comparison means for comparing said first signal and said reference signal and generating a control signal when the current flowing through said relay coil exceeds a predetermined reference value, and switching means coupled between said comparison means and said relay coil for selectively regulating current to said relay coil in response to said control signal to maintain the average current flowing through said relay coil below said predetermined value.

16. The starting circuit as claimed in claim 15, wherein said comparison means comprises a comparator having a first input adapted to receive said first signal, a second input adapted to receive said reference signal, and an output for providing said control signal to said switching means.

17. The starting circuit as claimed in claim 15, wherein said current control means further comprises a resistor and a capacitor defining an RC oscillation circuit in connection with said comparison means, said RC oscillator circuit having an on-off switching frequency in which said switching means is activated and deactivated to control the current flowing through said relay coil.

18. The starting circuit as claimed in claim 17, further comprising a power device coupled between said switching means and said mechanical relay for activating said mechanical relay.

19. The starting circuit as claimed in claim 18, wherein said power device comprises a field effect transistor.

20. The starting circuit as claimed in claim 18, wherein said switching means comprises a transistor.

21. A starting circuit for a single-phase induction motor having a start capacitor, a start winding and a run winding comprising:

relay means for connecting and disconnecting the start capacitor and the start winding from a power supply, said relay means comprising a mechanical relay having a relay coil;

user adjustable pick-up voltage means for allowing a user to select a pick-up voltage in the field, said user adjustable pick-up voltage means being operative to activate said mechanical relay to disconnect the start capacitor and the start winding from the power supply when the start winding voltage exceeds said selected pick-up voltage;

time-based protection means for automatically activating said mechanical relay to disconnect the start capacitor and the start winding from the power supply after a predetermined amount of time to protect the motor against missetting of the selected pick-up voltage and when the motor will not start for any reason; and current control means for maintaining current flowing through said relay coil below a predetermined value to protect said mechanical relay from excessive current created by the rise in start winding voltage induced from the rise in voltage in the run winding.

22. The starting circuit as claimed in claim 21, wherein said current control means further comprises means for generating a first signal indicative of the current flowing through said relay coil, means for generating a reference signal, comparison means for comparing said first signal and said reference signal and generating a control signal when the current flowing through said relay coil exceeds a predetermined reference value and switching means coupled between said comparison means and said relay coil for selectively regulating current to said relay coil in response to said control signal to maintain the average current flowing through said relay coil below said predetermined value.

23. The starting circuit as claimed in claim 21, wherein said time-based protection means comprises timing means for generating a timing signal after a predetermined period of time, means for generating a timer reference signal, and comparison means for comparing said timing signal and said timer reference signal and generating a control signal after said predetermined time, said relay means being responsive to said control signal to disconnect the start capacitor and the start winding from the power supply.

24. The starting circuit as claimed in claim 21, wherein said user-adjustable pick up voltage means comprises pick-up reference means for generating a first signal representing said selected pick-up voltage, means for generating a second signal indicative of the start winding voltage, and comparison means for comparing said first and second signals and generating a control signal when the start winding voltage exceeds the selected pick-up voltage, said relay means being responsive to said control signal to disconnect the start capacitor and the start winding from the power supply.

25. A method of replacing a first starting circuit connected to an induction motor having a start capacitor, start winding, run winding and a given pick-up voltage at which the start capacitor and the start winding are to be disconnected from a power supply and the run winding is to remain connected to the power supply to allow continued operation of the motor after it is started, the first starting circuit having a fixed pick-up voltage rating corresponding to the given pick-up voltage of the motor, comprising the steps of:

(a) removing the first starting circuit from the motor;

(b) replacing the first starting circuit with a second starting circuit comprising relay means for connecting and disconnecting the start capacitor and the start winding from the power supply, and user adjustable pick-up voltage means for allowing a user to select a pick-up voltage in the field, said user adjustable pick-up voltage means being operative to activate said relay means to disconnect the start capacitor and the start winding from the power supply when the start winding voltage exceeds said selected pick-up voltage, and wherein the run winding remains connected to the power supply after said relay means is activated to allow continued operation of the motor after it is started; and (c) adjusting said pick-up voltage means in the field to correspond to the given pick-up voltage of the motor.

\* \* \* \* \*